United States Patent Office

2,697,691
Patented Dec. 21, 1954

2,697,691

FIRE EXTINGUISHING FOAM COMPOSITION

Joseph M. Perri, West Goshen Township, Chester County, Pa., assignor to National Foam System, Inc., Philadelphia, Pa., a corporation of Delaware No Drawing. Application November 14, 1949,
Serial No. 127,251

6 Claims. (Cl. 252—8.05)

This invention relates generally to fire extinguishing compositions and more particularly to such foam-forming compositions as are capable, when combined with water and air, of producing a stabilized foam which is nonsupporting of combustion and serves as a blanket to smother and extinguish the flames of such highly combustible materials as oil, gasoline and the like.

While heretofore and prior to this invention various proteinaceous compositions have been employed in the production of so-called air or mechanical foam formed by entraining a gaseous medium, such as air, into a finely subdivided stream of water in the presence of a suitable foaming agent or stabilizer, it has been found that such compositions, when in the liquid state necessary for use in the production of mechanical foam, do not readily admix with the water stream and are not capable of being inducted therein in requisite foam-forming concentration when the temperature of the liquid composition is below 30° F. The difficulty of satisfactorily employing such proteinaceous foam-forming liquids at temperatures below 30° F. and with water at just about freezing temperature appears to be mainly due to the fact that at such low temperatures of the water an insufficient amount of the foam-forming liquid is dissolved in the water for production of a satisfactory foam, this being true even though the foam-forming liquid itself has a freezing temperature of as low as 5° F.

The mere addition of an antifreeze agent, such as ethylene glycol, for depressing the freezing temperature of the foam-forming liquid, even to as low as −30° F., does not in itself solve the problem, it having been found that the percentage of such liquid proportioned into the water stream at water temperatures of 30° F. and below does not exceed 1½ per cent of the water volume, whereas a percentage of at least 4½ per cent is required for the production of a foam of satisfactory volume and stability.

It is accordingly among the principal objects of the present invention to overcome the aforementioned difficulties of producing mechanical foam with water at low temperatures by the preparation and use of a foam-forming liquid having as its active principle a proteinaceous hydrolysate, preferably that of dried blood, in association with an hydrotropic agent and an alcohol, which together serve to lower the freezing point of the liquid and at the same time reduce the viscosity of the liquid to a point at which its fluidity is maintained substantially constant and unaffected under varying conditions of temperature.

A further object is to combine with the proteinaceous principle of the foam-forming material agents capable of rendering the foaming agent more readily dispersible in the cold water stream, thereby increasing the volume and stability of the foam produced with the foam-forming liquid of the present invention.

Other objects and advantages of the present invention will be apparent hereinafter.

In the production of the foam-forming material of the present invention, a batch of the proteinaceous principle is first produced in accordance with the following procedure. Into 2600 gallons of water, heated to about 190–200° F., is added approximately 600 pounds of hydrated lime of high calcium content, approximately 50 pounds of sodium hydroxide and approximately 50 pounds of lead oxide. This mass is mechanically stirred in the reactor until a thorough admixture is obtained, the temperature of the water being maintained during all of the mixing period at around 200° F.

To this initial mixture is then added 2600 pounds of a suitable protein, preferably dried blood, the ensuing mass (of water, caustic soda, lead oxide and protein) being then heated continuously for a period of about seven hours at a sustained temperature of approximately 200° F., following which about 80 gallons of sulphuric acid (60° Baumé) is added to render the reaction mass acid to a pH of about 3.5 to 4.0. Thereafter, the acid reaction is permitted to continue for about one hour at a reaction temperature of approximately 200° F. It is preferred that the reaction mass have a final pH of from 7.5 to 8.0 in order to render the foaming agent produced therefrom suitably soluble in water and, accordingly, a sufficient quantity of neutralizing lime is added to the mass to raise its pH to a value of from 7.5 to 8.0.

Upon completion of the foregoing operations, all carried out while maintaining the temperature of the mass at about 200° F., the mass is then filtered to remove the calcium sulphate (resulting from the reaction of the lime and acid) and other insoluble material that may be present, following which the filtrate is treated with about 140 pounds of zinc dust for about one hour and then refiltered. The resulting dilute filtrate is then evaporated to a specific gravity of 1.170 and 1.180 and the pH thereof is thereafter adjusted to a final value of 7.0 to 7.5.

To this resulting liquid is preferably added pyridyl mercuric acetate in the proportion of about 3 pounds thereof per 1000 gallons of the liquid, and also ferrous sulphate in the proportion of about 0.15 pound thereof per gallon of the liquid, the pyridyl mercuric acetate being employed as a preservative and inhibitor against deterioration and decomposition, while the ferrous sulphate serves to render the foam more stable and less subject to rapid disintegration.

The liquid mass prepared as above described is now finally filtered, the resultant hydrolysate being then ready for the addition thereto of the agents hereinbefore referred to for rendering the hydrolysate suitable for use as a foam-forming liquid at subzero temperatures.

This foam-forming liquid is prepared substantially in accordance with the following formula:

| | Gallons |
|---|---|
| Proteinaceous hydrolysate (prepared as above described) | 10 |
| Sodium xylene sulphonate (40% aqueous solution) | 7.5 |
| Methanol | 6.0 |

Of the above ingredients added to the hydrolysate, the sodium xylene sulphonate, otherwise known as sodium dimethyl benzene sulphonate, serves as an hydrotropic agent to depress the pour point of the foam-forming liquid and provide such reduced viscosity thereof as to insure its requisite fluidity under widely varying conditions of temperature. In addition, such hydrotropic agent imparts to the foam-forming liquid a high degree of solubility in water of low temperatures, thus enabling the liquid to be quickly dispersed in a water stream in the proportion requisite to produce fire-extinguishing foam of satisfactory volume and stability. While I have found sodium xylene sulphonate most effective as an hydrotropic agent, either sodium toluene sulphonate, also known as sodium methyl benzene sulphonate, or sodium para-cymene sulphonate, also known as sodium methyl isopropyl benzene sulphonate, may also be effectively employed as such agent, the use of either of which alkali metal salts of the alkyl benzene sulphonic acids would be in the same proportion as that given for the sodium xylene sulphonate in the above formula. The proportion of hydrotropic agent incorporated in the foam-forming liquid preparation may vary from 25 to 35 per cent by volume of the final product.

The presence of the methanol in the foam-forming liquid not only assists the hydrotropic agent in rendering the liquid readily dispersible in the water stream under normally varying conditions of temperature, but also serves to lower the freezing temperature of the liquid to −20° F.

The presence of the methanol in the foam-forming liquid provides an extreemly low freezing temperature for the liquid and so maintains the latter, even when subjected to subzero temperatures of as low as —20° F., in such state of fluidity as to insure the effectiveness of the hydrotropic agent (e. g. sodium xylene sulphonate) as a dispersant for the liquid in the water stream. In lieu of methanol, other water-soluble alcohols may be employed to depress the freezing temperature of the foam-forming liquid, as, for example, isopropyl alcohol, ethyl alcohol, diacetone alcohol and tetrahydrofurfuryl alcohol. Or, there may be employed for this purpose the glycols or their ethers, such as the mono ethyl ether of ethylene glycol or the mono ethyl ether of diethylene glycol. These freezing point depressants may be used singly and to the exclusion of the others, or they may be combined for introduction into the foam-forming liquid in the proportion of approximately 20 to 30 per cent by volume of the completed product.

It will be understood, of course, that the proportions of ingredients hereinbefore described are not critical and that such proportions may vary from time to time within reasonable limits without departing from the general principles or real spirit of the invention as defined in the appended claims.

What is claimed as new and useful is:

1. A foam-forming composition consisting essentially of a solution of a solubilized proteinaceous material having a specific gravity of about 1.170 to 1.180 and a pH of about 7.0 to 7.5, a hydrotropic agent selected from the group consisting of sodium xylene sulphonate, sodium toluene sulphonate and sodium para-cymene sulphonate, and a freezing point depressant selected from the group consisting of water-soluble alcohols and water-soluble glycols and their ethers, said solution containing 25 to 35 per cent by volume of a 40 per cent aqueous solution of said hydrotropic agent and 20 to 30 per cent by volume of said freezing point depressant to provide a freezing point appreciably below 0° C. and a pour point insuring a high degree of solubility in cold water of any temperature above freezing.

2. A foam-forming composition consisting essentially of an aqueous solution of a proteinaceous hydrolysate in which is incorporated a 40 per cent aqueous solution of sodium xylene sulphonate in an amount approximating 25 to 35 per cent by volume to insure solubility and complete dispersion of the solution in cold water of any temperature above freezing, and a freezing point depressant selected from the group consisting of water-soluble alcohols and water-soluble glycols and their ethers, said freezing point depressant constituting 20 to 30 per cent by volume of the solution to provide the same with a freezing point appreciably below 0° C.

3. A foam-forming composition consisting essentially of an aqueous solution of a proteinaceous hydrolysate in which is incorporated a 40 per cent aqueous solution of sodium toluene sulphonate in an amount approximating 25 to 35 per cent by volume to insure solubility and complete dispersion of the solution in cold water of any temperature above freezing, and a freezing point depressant selected from the group consisting of water-soluble alcohols and water-soluble glycols and their ethers, said freezing point depressant constituting 20 to 30 per cent by volume of the solution to provide the same with a freezing point appreciably below 0° C.

4. A foam-forming composition consisting essentially of an aqueous solution of a proteinaceous hydrolysate in which is incorporated a 40 per cent aqueous solution of sodium para-cymene sulphonate in an amount approximating 25 to 35 per cent by volume to insure solubility and complete dispersion of the solution in cold water of any temperature above freezing, and a freezing point depressant selected from the group consisting of water-soluble alcohols and water-soluble glycols and their ethers, said freezing point depressant constituting 20 to 30 per cent by volume of the solution to provide the same with a freezing point appreciably below 0° C.

5. A foam-forming composition consisting essentially of an aqueous solution of a proteinaceous hydrolysate of a specific gravity of about 1.170 to 1.180 and a pH of about 7.0 to 7.5, said hydrolysate including as added ingredients therein a pour point depressant selected from the group consisting of sodium xylene sulphonate, sodium toluene sulphonate and sodium para-cymene sulphonate in combination with a freezing point depressant selected from the group consisting of water-soluble alcohols, water-soluble glycols and their ethers for depressing the freezing point of said solution to —20° F., said added ingredients being present in the solution in the approximate proportions of 25 to 35 per cent by volume of a 40 per cent aqueous solution of the pour point depressant and 20 to 30 per cent by volume of the freezing point depressant, the solution being readily soluble in cold water of any temperature above freezing in the proportion of at least 4½ per cent of the water volume.

6. In a foam-forming composition as defined in claim 5 wherein the proteinaceous hydrolysate is derived from dried blood.

References Cited in the file of this patent

UNITED STATES PATENTS

| Number | Name | Date |
| --- | --- | --- |
| 2,154,231 | Daimler et al. | Apr. 11, 1939 |
| 2,165,997 | Daimler et al. | July 11, 1939 |
| 2,365,619 | Bagley et al. | Dec. 19, 1944 |
| 2,413,667 | Urquhart | Dec. 31, 1946 |

FOREIGN PATENTS

| Number | Country | Date |
| --- | --- | --- |
| 541,815 | Great Britain | Dec. 12, 1941 |
| 580,070 | Great Britain | Aug. 26, 1946 |

OTHER REFERENCES

Surface Active Agents, Schwartz and Perry (1949), Interscience Pub. Inc., New York, pages 120 and 308.